(12) United States Patent
Delmoro et al.

(10) Patent No.: US 6,578,275 B1
(45) Date of Patent: Jun. 17, 2003

(54) LOADWHEEL DRIVE ASSEMBLY AND METHOD

(75) Inventors: Richard L. Delmoro, Tallmadge, OH (US); David P. Krause, Hartville, OH (US)

(73) Assignee: Akron Special Machinery, Inc., Akron, OH (US)

( * ) Notice: Subject to any disclaimer, the term of this patent is extended or adjusted under 35 U.S.C. 154(b) by 0 days.

(21) Appl. No.: 09/931,488

(22) Filed: Aug. 17, 2001

(51) Int. Cl.$^7$ ................................................ G01M 17/02
(52) U.S. Cl. ............................. 33/1 PT; 33/203; 73/146
(58) Field of Search ........................... 33/1 PT, 706, 33/707, 708, 203, 203.12, 203.13, 203.18; 73/146, 460

(56) References Cited

U.S. PATENT DOCUMENTS

| | | | | |
|---|---|---|---|---|
| 4,366,707 A | * | 1/1983 | Jarschel | 73/146 |
| 4,704,900 A | * | 11/1987 | Beebe | 73/146 |
| 4,901,442 A | * | 2/1990 | Fujii | 33/203 |
| 4,989,329 A | * | 2/1991 | Pullen | 33/1 PT |
| 6,360,593 B1 | * | 3/2002 | Schoenfeld | 73/146 |

* cited by examiner

Primary Examiner—Christopher W. Fulton
(74) Attorney, Agent, or Firm—Reese Taylor

(57) ABSTRACT

The present invention generally provides an apparatus and method for accurately and rapidly imposing the required average force on a tire by using a drive mechanism, which initially drives the loadwheel carriage to a known average load position for tires of the type under test. This average can be computed based on a single previous test tire or based on an entire population of previously tested tires of the same or similar type.

20 Claims, 5 Drawing Sheets

LOADWHEEL DRIVE ASSEMBLY AND METHOD

RELATED PATENT APPLICATIONS

None.

BACKGROUND OF THE INVENTION

Tire uniformity machines, in general and their use and function are well known in the art. As part of an overall testing and inspection program conducted in connection with the production of pneumatic tires, these machines are utilized to take various measurements characterizing the uniformity of a tire. This characterization is accomplished by measuring the nature of forces generated by the tire as it rolls or is rotated along a surface.

In general, the typical tire uniformity machine includes a frame and associated conveyors moving tires to be tested into and out of the frame. Inflation means and a chucking assembly are provided to inflate the tire and rotate the tire against a loadwheel which is selectively movable into and out of engagement with the periphery of the tire. Various sensors and other pieces of instrumentation are connected to the loadwheel to obtain the desired information and measurements concerning the reaction characteristics of the tire. SAE specification J332, to which most tire uniformity machines are manufactured, specifies that the machine's loadwheel have a diameter of 33.625 inches with a mean radial force equal to 85% of the tire and rim association load rating for the tire.

In a typical loadwheel assembly, the loadwheel is rotatably mounted on a carriage supported by a pair of L-shaped gibs or "THK" style rails allowing the loadwheel to be selectively brought into and out of contact with the tire for purposes of simulation. In one known system, the motion of the carriage is controlled by a D.C. motor via a 15:1 gear box reduction and a 54T–23T chain-sprocket drive increase with a resulting reduction of 6.39:1 to a 0.25 inch pitch ball screw. The maximum speed of such a system is about 1.1 inches per second. Loading is accomplished by using a 4-quadrant D.C. drive that controls the velocity of the loadwheel carriage. Using the velocity control method, the loadwheel is initially advanced at full speed until its load cells detect increase in the instantaneous load. When the measured load is within 200 pounds of a setpoint load the analog velocity setpoint to the D.C. drive is reduced as the "load error" decreases. In this system, it is necessary to load to an average radial force, which is calculated over one or more revolutions of the tire.

A typical load cycle for such a system consists of the following events and time periods. The loadwheel is advanced from a retracted position to the face of the tire at the maximum velocity of about 1.1 inches per second to a distance at least 1 inch from the tire to ensure clearance during tire chucking. This event typically takes 0.9 seconds. From this point, the loadwheel is advanced from tire contact to within 200 pounds of a setpoint load at 1.1 inches per second. This event covers a distance of about 1 inch based on a load setpoint of 1200 pounds and a tire spring rate of 1000 pounds per inch. The event takes about 1 second to perform. Finally, the loadwheel is advanced to an average setpoint maintaining an error window of plus or minus 20 pounds of the load setpoint and at a velocity proportional to the average load error. The loadwheel moves approximately 0.2 inches and requires 1.5 to 2 seconds for this event. Overall, the total distance moved by the loadwheel is about 2.2 inches and takes about 3.4 to 3.9 seconds to perform.

Actually loading time or "servo" time is often much longer due to servo tuning problems that result in overshooting or undershooting the desired load setpoint. A large variation in load setpoints and tire spring rates adds to the difficulty of achieving a precise load setpoint regardless of cycle time. These difficulties have been described in U.S. Pat. No. 4,704,900 to Beebe, which uses a plurality of instantaneous radial force measurements with a corresponding instantaneous loadwheel position measurement to control the measurement to control the commanded position of the loadwheel.

SUMMARY OF THE INVENTION

It is, therefore, an aspect of the present invention to provide a more accurate and rapid system for imposing the required average force on a tire by a loadwheel.

The present invention generally provides an apparatus and method for accurately and rapidly imposing the required average force on the tire by using a drive mechanism, which initially drives the loadwheel carriage to a known average load position for tires of the type under test. This average can be computed based on a single previous test tire or based on an entire population of previously tested tires of the same or similar type.

It accordingly becomes a principal object of this invention to provide a loadwheel drive assembly of the character above-described with other objects thereof becoming more apparent upon a reading of the following brief specification considered and interpreted in view of the accompanying drawings.

BRIEF DESCRIPTION OF THE PREFERRED EMBODIMENTS

Figure 2:
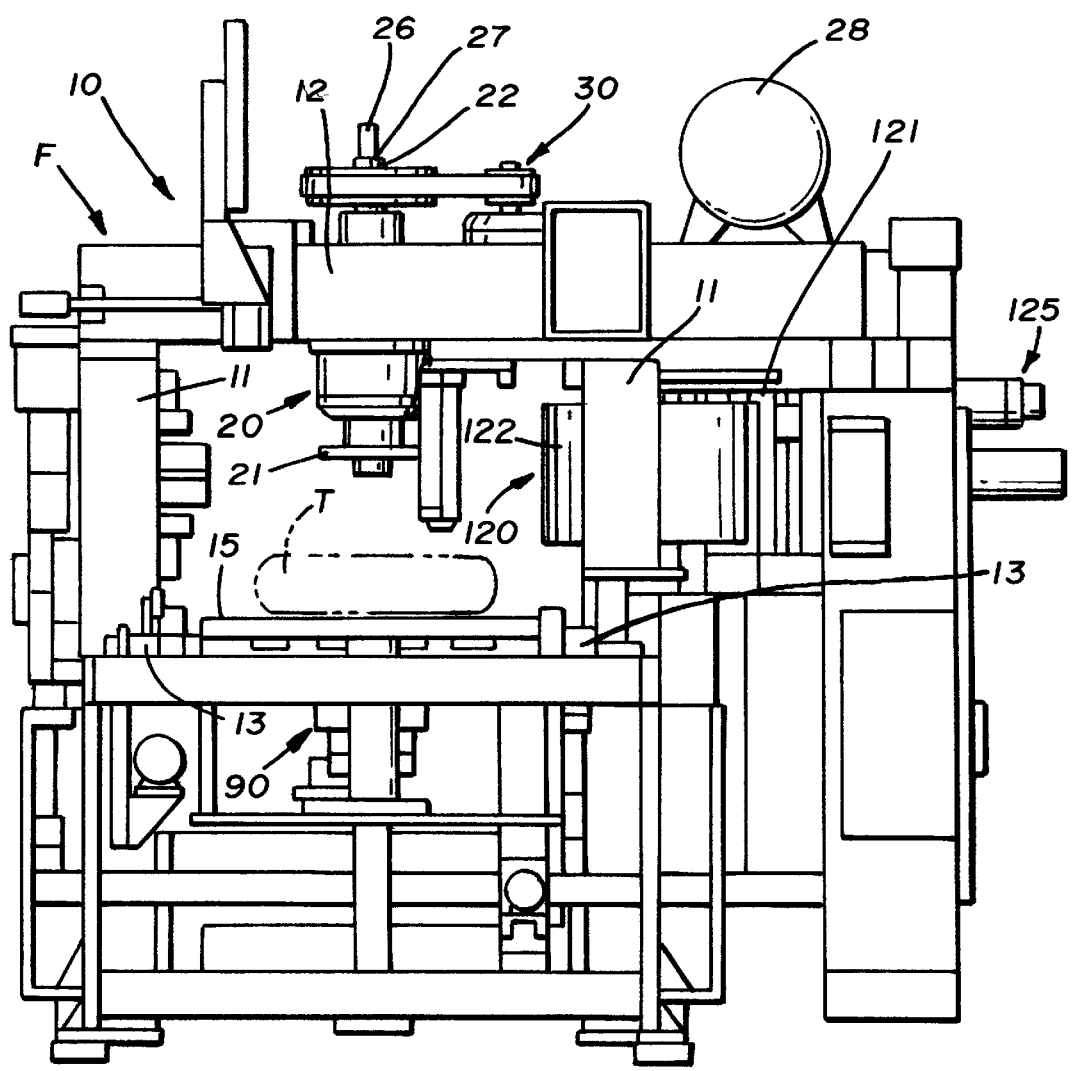
FIG. 2 is a front elevational view thereof.
Figure 3:
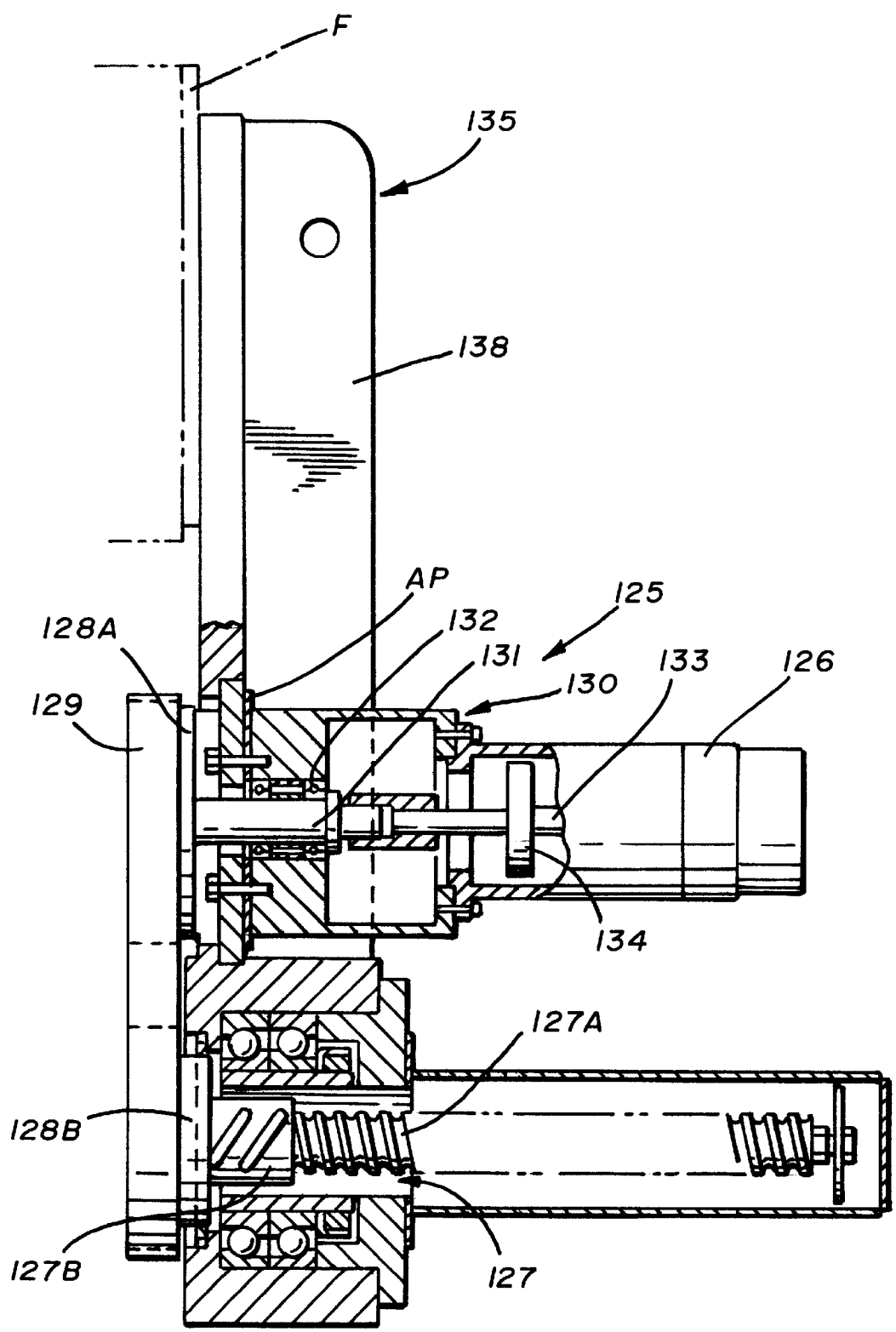
FIG. 3 is a front elevational view of a loadwheel drive assembly according to the present invention that has been partially sectioned, partially cut away to depict details of the loadwheel drive assembly's internal components.

A tire uniformity machine, generally indicated by the numeral 10 in the figures, generally includes, as best shown in FIG. 2, vertical side frame members 11, 11 generally horizontal top frame member 12 and generally horizontal bottom frame members 13, 13 to form the framework F for the machine 10, creating generally a box-like structure within which a tire T is received and tested.

Figure 1:
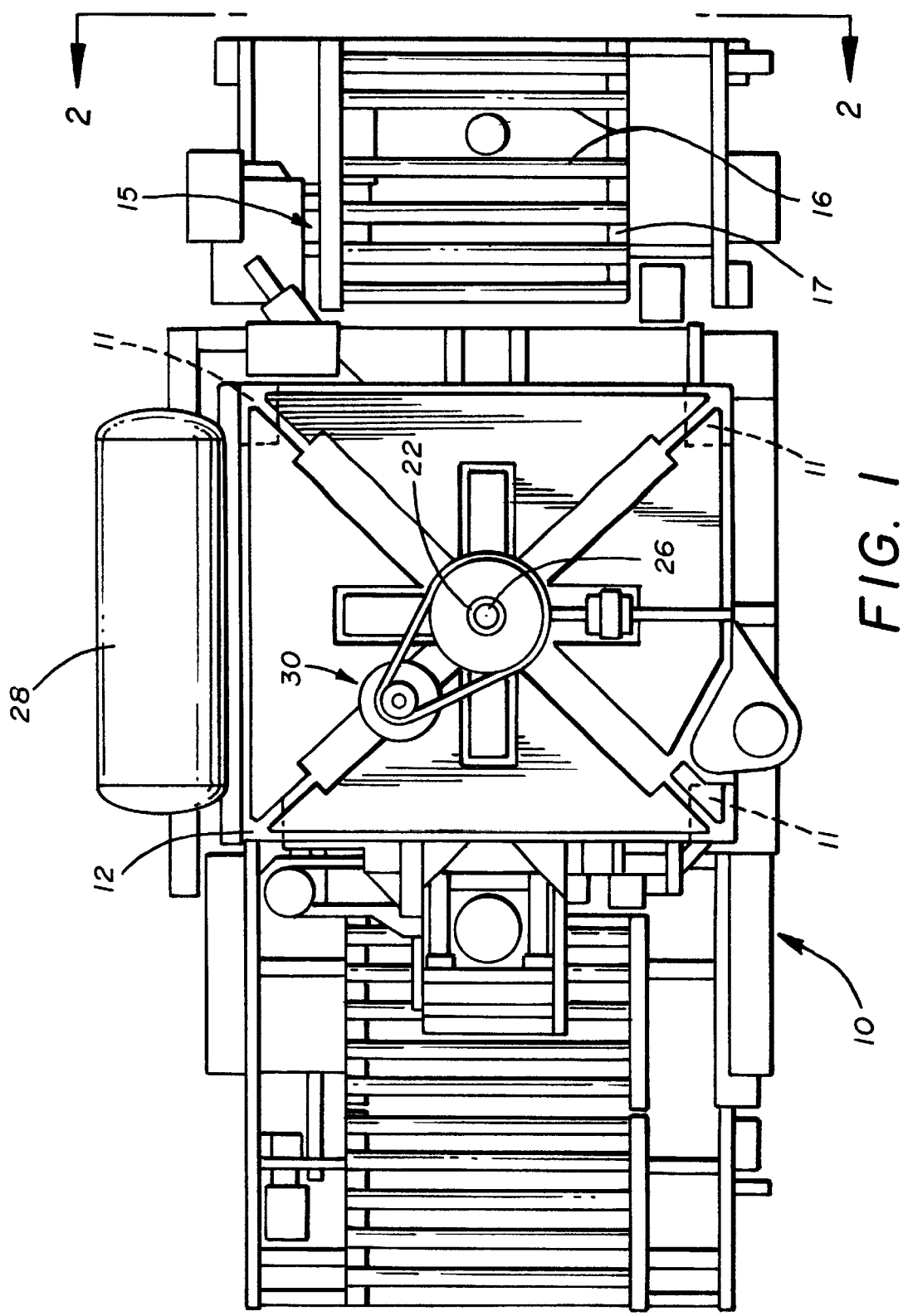
FIG. 1 is a top plan view of a tire uniformity machine according to the present invention.

As best shown in FIG. 1, tire T may be delivered into the framework F of the machine 10 and removed therefrom after testing as by a conveyer, generally referred to by the numeral 15. Conveyer 15 may include a plurality of rollers 16 rotatably supported between parallel side members 17 forming a roller bed. The side members 17, 17 of conveyer 15 and side members 11, 11 of machine 10 are generally spaced to an extent such that they are capable of receiving tires of significantly varying diameter. Once the tire T is brought within the framework F of the machine 10, the tire T is chucked and prepared for testing.

In that regard, the upper frame members 12, 12, carry an upper chuck assembly, generally referred to by the numeral 20, shown in FIG. 2, which generally includes a chuck, which may be attached to adapter 21 and a spindle 22 which rotates during the testing operation. The spindle 22 may be made hollow defining a passage for transporting air to and from the tire T to maintain proper inflation thereof. To that end, a union 26 may be rotatably coupled to a first end 27 of spindle 22 such that the spindle 22 may rotate within union 26 facilitating delivery of air to the tire T, from an air supply 28 (FIGS. 1 and 2), during rotation of the upper chuck assembly 20.

The spindle 22 is driven by a motor assembly, generally indicated by the numeral 30, operatively coupled, as by a belt, to the spindle 22 near the first end 27 thereof. It will be appreciated that motor assembly 30 may be coupled to spindle 22 at other locations, and alternatively may be used to drive the lower chuck assembly 90 to the same effect.

Lower chuck assembly 90 is similar to upper chuck assembly 20. Lower chuck assembly 90 is freely rotatable, and rotates under torque generated by motor assembly 30 acting through the upper chuck assembly 20 and the chucked tire T.

When a tire T is received within the machine 10, the lower chuck assembly 90 may be moved axially to chuck the tire T between the upper and lower chuck assemblies 20, 90 in preparation for testing. It will be appreciated that when the lower chuck assembly 90 is in its retracted position, i.e., below the conveyor assembly 15, the tire T may be freely moved into registry with the lower chuck 90 along conveyor 15. At this point, the lower chuck assembly 90 may be elevated so that the tire T is firmly seated between lower chuck assembly 90 and upper chuck assembly 20. The tire T is then inflated to the desired inflation pressure by air directed from supply 28 through the air passage formed in chuck assembly 20. Once inflated, the tire T is rotated and a loadwheel 122, described below, can then be moved into engagement with the tire T to perform the testing thereon.

A loadwheel assembly generally indicated by the numeral 120, is also provided and is carried by a carriage, generally referred to by the numeral 121, which may be slideably mounted on the frame F. The loadwheel assembly 120 includes a loadwheel 122 rotatably mounted on spindles located on carriage 121. The spindles have associated with them load cells (not shown) which are used to measure certain characteristics of the tire, as will be explained. The carriage 121 is movable toward and away from the tire T under the power of a loadwheel drive assembly, generally indicated by the numeral 125.

Loadwheel drive assembly 125 is generally located adjacent the loadwheel carriage 121 and in operable contact therewith to move the loadwheel 122 into and out of contact with the tire T. The loadwheel drive assembly 125 generally includes a drive motor 126, which may be any conventional motor or a servo drive system, a ball screw assembly 127 including a ball screw 127A and a ball nut 127B; and a coupler 129 operatively connecting the motor 126 to the ball screw assembly 127. Many commercially available servo systems are suitable including the Indramat model DKC01.3-040-7-FW servo drive and Indramat MKD090B-035-KG0-KN servo motor, which are listed as examples of the many commercially available systems and are thus not intended to be limiting. To accommodate various drive motors or, when retrofitting a drive assembly of the present invention to an existing tire uniformity machine 10, an adapter assembly, generally referred to by the numeral 130 may be used. In general adaptor 130 may include a shaft extension 131 rotatably supported by bearings 132 and coupled to the drive shaft 133 of motor 126 by a suitable coupler. To accommodate attachment of different motor manufacturers, adapter 130 may be provided with multiple bolt circles or slotted receivers. To adjust for differences in the axial position of motor 126 and adapter 130, an adapter plate AP may be provided as a spacer between the adapter assembly 130 and the casting or loadwheel support member 135.

The drive motor 126 is coupled to a ball screw assembly 127 such as by pulleys or sprockets 128A, 128B connected by a coupler 129, such as a belt. To provide vertical adjustment, slotted bores 136 may be used to receive the motor mounting bolts and drive shaft. The size of sprockets 128 may change relative to each other to accomplish the appropriate drive ratio such as a one to one, two to one, or four to one reduction from the drive motor 126 to the ball screw assembly 127. It will be appreciated that other ratios may be used as necessary.

With the drive motor 126 and ball screw assembly 127 coupled, the drive motor 126 causes rotation of the ball nut 127B which in turn drives the carriage 121 toward or away from the tire T depending on the direction of rotation of the ball nut 127B. As the loadwheel 122 is driven axially, a position sensor 134 monitors the position of the loadwheel 122. A suitable position sensor 134 would include a position sensor located on the loadwheel 122 or frame F, incremental or absolute linear sensor, or an encoder such as incremental encoder, absolute encoder or sine encoder, or a resolver such as a multi-turn resolver feedback sensor. Other suitable sensors would include linear position or tempasonic sensors. In the embodiment shown, servo drive 126 includes a multi-turn resolver feedback position sensor 134 that determines loadwheel position from rotation of the drive motor 126. In this way, feedback from the drive motor 126 is used to position the loadwheel 122.

Figure 4:
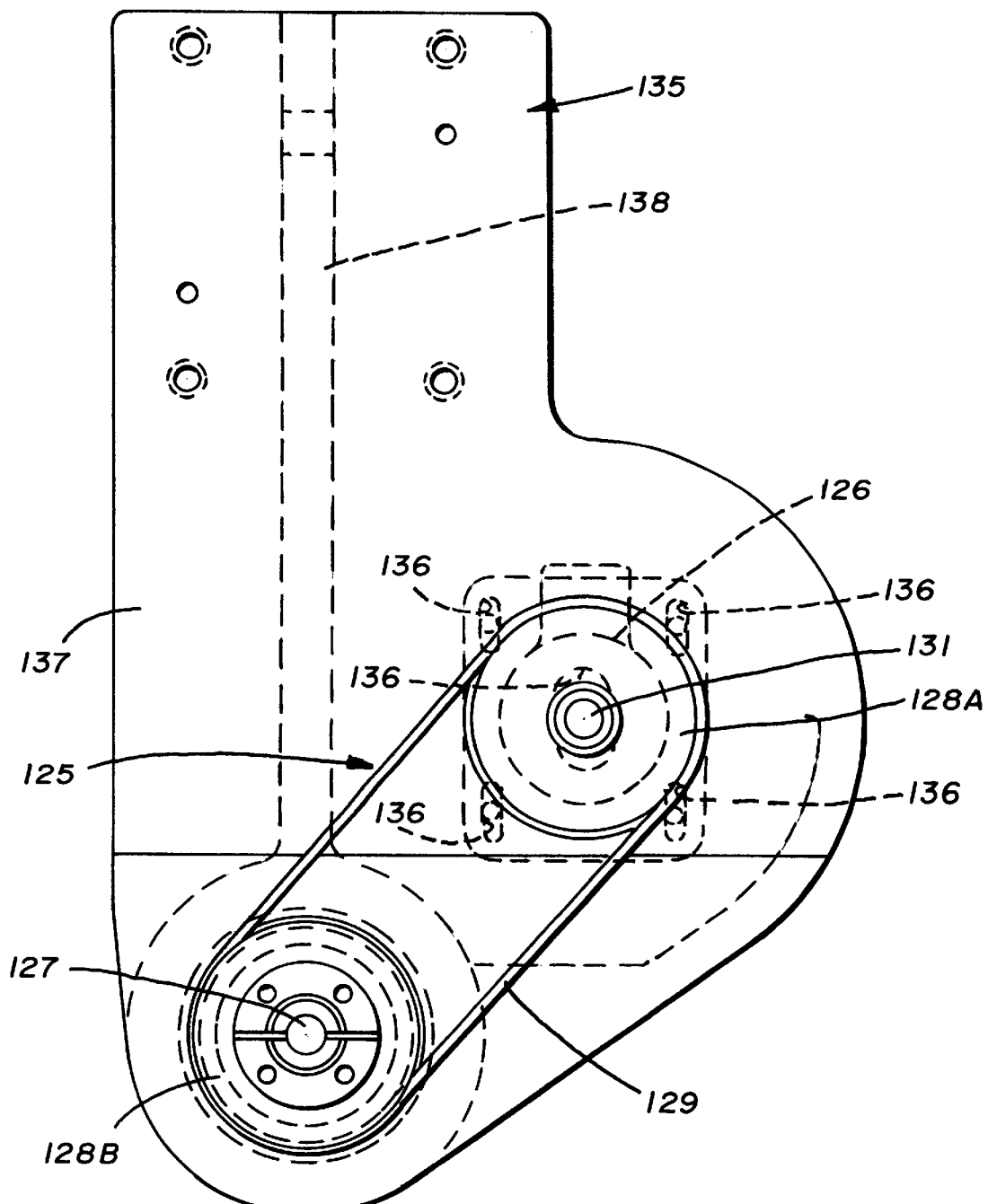
FIG. 4 is a side elevational view thereof.

As will be appreciated, the loadwheel drive assembly 125 may be attached directly to the frame F of tire uniformity machine 10. As an alternative, the loadwheel drive assembly 125 may be supported on a loadwheel drive assembly member, generally indicated by the numeral 135. The loadwheel support member 135 may then be attached to the frame F or other supporting structure in any conventional manner including fasteners or welds. In the embodiment shown in FIG. 4, support member 135 is provided with a plurality of receivers that accommodate fasteners attaching the support member 135 to frame F. As shown in FIG. 4, the support member 135 has a planar surface 137 to which the drive assembly 125 is attached. This member may be provided with a gusset 138 or other reinforcing material as necessary. In the embodiment shown in FIG. 5, the support member 135 holds the motor 126 in spaced relation to the ball screw 127 with these being coupled by a coupler 129, which in this case is a belt drawn between sprockets 128, as previously described. As an alternative, the ball screw 127 may be directly driven with the motor 126 being supported coaxially with the ball screw 127.

Figure 5:
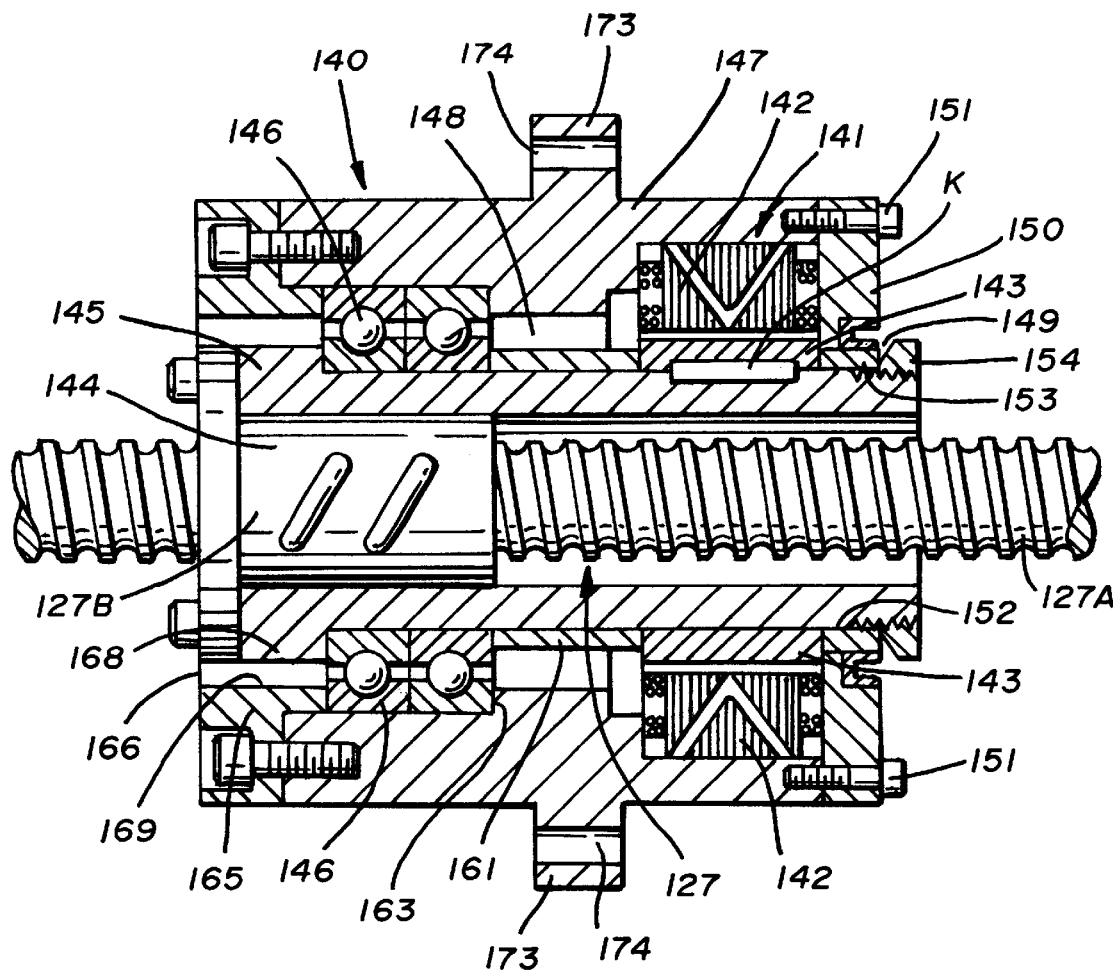
FIG. 5 is a partially sectional partially cutaway front elevational view depicting an alternative loadwheel drive assembly according to the present invention.

Such an alternative drive assembly, generally referred to by the numeral 140, is shown in FIG. 5 including a motor assembly 141 capable of directly driving the ball screw assembly 127. Motor assembly 141 generally includes an annular stator 142 surrounding a rotor 143 and a portion of the ball screw assembly 127 as described more completely below. Motor 141 may be a brushless motor as shown, such that energizing the stator 142 causes rotation of the rotor 143 and in turn the ball screw 127.

As previously described, the ball screw assembly 127 interacts with the carriage 121 of loadwheel 122 to cause the loadwheel 122 to move toward and away from the tire T. To drive the ball screw 127, the motor assembly 141 is coupled to the ball screw 127 as by a ball nut 144. As shown, ball nut 127B attaches to an inner sleeve 145 that defines a bore for receiving a portion of the ball screw 127A. Rotor 143 is coupled to inner sleeve 145 in a conventional manner, such as by a key K, such that rotation of rotor 143 causes rotation of the inner sleeve 145. Suitable bearings 146 are provided to allow free rotation of the inner sleeve 145 within a housing 147. Since the inner sleeve 145 is connected to the ball nut 127B, rotation of the rotor 143 causes axial movement of ball nut 127B and carriage 121.

It will be appreciated that a ball screw assembly 127 may be fastened such that the rotor 143 couples directly to the ball screw assembly 127. Use of the ball nut 127B and sleeve 145 arrangement allows the direct drive motor assembly 141 to be easily attached and retrofit to an existing drive assembly using a conventional ball screw assembly 127.

The housing 147 may be made to receive the motor assembly 141 and the bearing assembly 146. In the embodiment shown, the housing 147 is generally annular having a bore 148 capable of receiving the motor assembly 141 and bearing assembly 146 open at each end. At a first end 149 of housing 147, an end plate or seal plate 150 attaches to the housing 147, as by bolts 151, and generally closes the housing 147 at the first end 149. The end plate 150 is generally annular providing an opening 152 that allows passage of the inner sleeve 145 and ball screw 127. A seal 153 is provided between the end plate 150 and inner sleeve 145 to effectively close the opening of the housing 147 at first end 149. A locknut 154 may be attached to the inner sleeve 145 to maintain the axial position of the sleeve 145 relative to the housing 147.

The motor assembly 141 may be located adjacent seal plate 153 within housing 147 and spaced from the bearing assembly 146 by a spacer ring 161. The bearing assembly 146 is then located adjacent spacer ring 161 and axially fixed by an inset portion 163 of housing 147 and a bearing lock hub 165 attached at the second end 166 of housing 147. To further restrict movement of the bearings, inner sleeve 145 may be provided with a radial flange 168 that extends radially toward the inner surface 169 of lock hub 165 adjacent to the bearing assembly 146.

To facilitate attachment to the tire uniformity machine 10, the housing 147 may be provided with an annular flange 173 extending radially outwardly from housing 147. A plurality of radially spaced openings 174 may be provided within the flange 173 to receive suitable fasteners for attaching the housing 147 to the machine 10. Once assembled, drive assembly 140 causes rotation of ball screw assembly 127 by application of a drive current to the stator 142 causing the loadwheel 122 to move toward or away from the tire T. As will be appreciated, the direction of movement is controlled by the direction of current flow through the stator 142. In determining the position of the loadwheel 122, the motor assembly 141 may incorporate an encoder or suitable position sensors may be mounted to determine position of the loadwheel 122 as previously discussed. Similarly, accurate and rapid positioning of the loadwheel 122 may be performed according to the same steps described with respect to the previous loadwheel drive assembly 125.

Drive assembly 140 may be used to directly drive the ball screw assembly 127 without the need for a pulley and belt connection. Without the pulley, drive assembly 140 provides a more compact assembly for driving the loadwheel 122.

In operation, the loadwheel drive assembly 125 positions the loadwheel such that the appropriate load is placed on the tire T. As previously mentioned, loads are often specified by standards set out by the Society of Automotive Engineers. To obtain the desired load on the tire T, the loadwheel drive assembly 125 communicates with a controller C providing controller C with loadwheel position information. When a tire T enters the framework F of the tire uniformity machine 10 and is chucked, loadwheel drive assembly 125 positions the loadwheel in an initial load position (ILP). This position may be determined in a variety of ways. The initial load position may be calculated prior to testing and manually entered. Alternatively, when a single tire of a number of tires (one or more) of the same type have previously been tested, the final position of the last tire of the same type may be used as the initial load position ILP for the present tire. Or, a historical average of the previous tires of same or similar type may be used to determine the initial load position ILP.

With the initial load position ILP determined, the loadwheel drive assembly 125 makes an initial move (IM) to the initial load position ILP. Since the loadwheel drive assembly 125 is moving the carriage 121 and loadwheel 122 to a set position, this move may occur at relatively high speed, or, in other words greater than a one inch per second move typically performed in the art. Using the Indramat ™ servo drive 126, moves of up to about 4 to about 6 inches per second may be attained. It will be appreciated that substitution of other drive systems may permit moves at other speeds including speeds greater than 6 inches per second.

Once the loadwheel 122 is in the initial load position ILP, an average radial load ARL is computed from the feedback from the loadwheel sensors 124. If the average radial load is within a previously determined tolerance, the load sequence is over. Otherwise, the loadwheel drive assembly 125 makes a corrective move (CM) to bring the average radial load within the tolerated level.

In performing the corrective move CM, the controller C calculates a target offset position (TOP). This position is calculated based on the difference between the initial load position ILP and the average radial load ARL multiplied by the spring rate ($K_T$) of the tire T under test.

$$\text{TOP} = \text{ILP} - K_T(\text{ARL}) \tag{1}$$

Once the target offset position TOP is determined, the loadwheel drive assembly 125 is commanded to make a relative position move in the correct direction equal to the target offset position TOP, or, in other words, an absolute position move to a new position target (NPT), which is the initial load position plus the target offset position.

$$\text{NPT} = (\text{ILP} + \text{TOP}) \tag{2}$$

When this move is completed, the average radial load ARL is recalculated with new data generated over one or more revolutions of the tire T. If the average radial load ARL is within tolerance, the loading sequence is over. Otherwise, the corrective move sequence may be repeated until the load is within the desired tolerance. With an accurate value for the spring rate $K_T$ of the tire T, the final load will be achieved on the initial move IM or after the first corrective move CM.

When the final load move has been completed, a brake (not shown) can be energized to maintain the loadwheel 122 in the desired position. Alternatively, when using a servo drive, the servo control system may be used to maintain the final load position.

When loading the first tire of a new tire type it will be necessary to modify the sequence of operations since there is no historical load set point position established. One possibility is to use prior art methods to load the first tire.

Alternatively, the loadwheel may be advanced at a slower constant velocity, about one inch per second until the control system detects an instantaneous load of about 100 pounds force. At this point, the loadwheel advancement is stopped and the average radial load ARL is calculated with data generated during one or more revolutions of the tire T. If the spring rate $K_T$ of the tire T is already known, the load correction move can be made in the same manner as previously described. If the spring rate $K_T$ is not known, a second move of about 0.5 inches is commanded. Based upon a typical spring rate of about 1000 pounds per inch for passenger tires, the average radial load will increase by an additional 500 pounds force. The distance for the second move can be increased or decreased, when the load reading of the tire makes it necessary to use a smaller or larger second move. For a diagram illustrating one method of driving the loadwheel 122, as described above, reference may be made to FIG. 7.

During operation, tire T is brought into the tire uniformity machine 10 along conveyor 15. Once the tire T is in registry with the chuck assembly (20,90), the tire T is chucked and rotated by the motor assembly 30. The loadwheel, 122 is then brought in to contact with the periphery of the tire T such that it rotates with tire T. Once the tire T is properly loaded by the loadwheel 122, the load cells 124 associated with the loadwheel 122 measure forces transmitted from the tire T to the loadwheel 122 and relay this information to controller C. These forces, along with other measurements made by the tire uniformity machine 10, allow the controller C to assess the characteristics of the tire T and make corrections as necessary.

While a full and complete description of the invention has been set forth in accordance with the dictates of the patent statutes, it should be understood that modifications can be resorted to without departing from the spirit hereof or the scope of the appended claims.

What is claimed is:

1. A loadwheel drive assembly in a tire uniformity machine having rotatable loadwheel for loading a tire, the loadwheel drive assembly comprising: a servo drive motor coupled to a ball screw assembly operatively connected to the loadwheel to move the loadwheel axially toward or away from the tire; said servo motor including a position sensor, whereby said sensor, determines a position of the loadwheel.

2. The loadwheel drive assembly of claim 1, wherein said servo motor and said ball screw assembly are coupled by a coupler, said coupler including a pair of sprockets respectively mounted on said motor and said ball screw and a belt spanning said sprockets.

3. The loadwheel drive assembly of claim 2, wherein said belt is a high efficiency synchronous drive belt.

4. The loadwheel drive assembly of claim 1, wherein reduction occurs between said servo motor and said ball screw assembly.

5. The loadwheel drive assembly of claim 4, wherein said reduction is 2 to 1.

6. The method of claim 1, wherein moving the tire to an initial load position includes moving the loadwheel at a rate greater than 1 inch per second.

7. The loadwheel drive assembly of claim 1, wherein said servo motor is adapted to maintain said loadwheel in a selected position without using a brake.

8. A method of positioning a loadwheel in a tire uniformity machine to load a tire for testing, the method comprising: moving the loadwheel to an initial load position; calculating the average radial load on the tire at the initial load position; and if the average radial load is not within a tolerance, making a corrective move to bring the average radial load within tolerance.

9. The method of claim 8, wherein the step of making a corrective move includes calculating a target offset position and adjusting the position of the loadwheel according to the target offset position.

10. The method of claim 9 wherein calculating the target offset position includes determining the difference between the initial load position and the average radial load multiplied by a spring rate for the tire being tested.

11. The method of claim 8, wherein determining the initial load position includes using a final position of a last tire of a same type as the tire being tested.

12. The method of claim 8, wherein determining the initial load position includes moving the tire to a historical initial load position, wherein the historical initial load position is an average of final load positions of previous tires of a same or similar type as the tire being tested.

13. A method of loading a tire in a tire uniformity machine having a controller that monitors testing and controls components in the tire uniformity machine, the method comprising: providing a loadwheel drive assembly having a servo motor coupled to a ball screw assembly by a high efficiency synchronous drive belt, said ball screw being in operative relation with the loadwheel such that rotation of the ball screw moves the loadwheel toward or away from the tire; moving the loadwheel to an initial load position; calculating the average radial load on the tire at the initial load position; if the average radial load is not within a tolerance, making a corrective move to bring the average radial load within tolerance.

14. The method of claim 13, wherein the step of making a corrective move includes calculating a target offset position and adjusting the position of the loadwheel according to the target offset position.

15. The method of claim 14 wherein calculating the target offset position includes determining the difference between the initial load position and the average radial load multiplied by a spring rate for the tire being tested.

16. The method of claim 13, wherein determining the initial load position includes using a final position of a last previously tested tire of a same or similar type as the tire being tested.

17. The method of claim 13, wherein determining the initial load position includes moving the tire to a historical initial load position, wherein the historical initial load position is an average of final load positions of previous tires of a same or similar type as the tire being tested.

18. The method of claim 13, wherein moving the tire to an initial load position includes moving the loadwheel at a rate greater than about 1 inch per second.

19. The method of claim 18 wherein said rate is greater than about 4 inches per second.

20. The method of claim 19, wherein moving the tire to an initial load position includes moving the loadwheel at a rate of about 4 to about 6 inches per second.

* * * * *